Fuller & Pierce
Fly Trap
N°. 7,288. Patented Apr. 16, 1850.
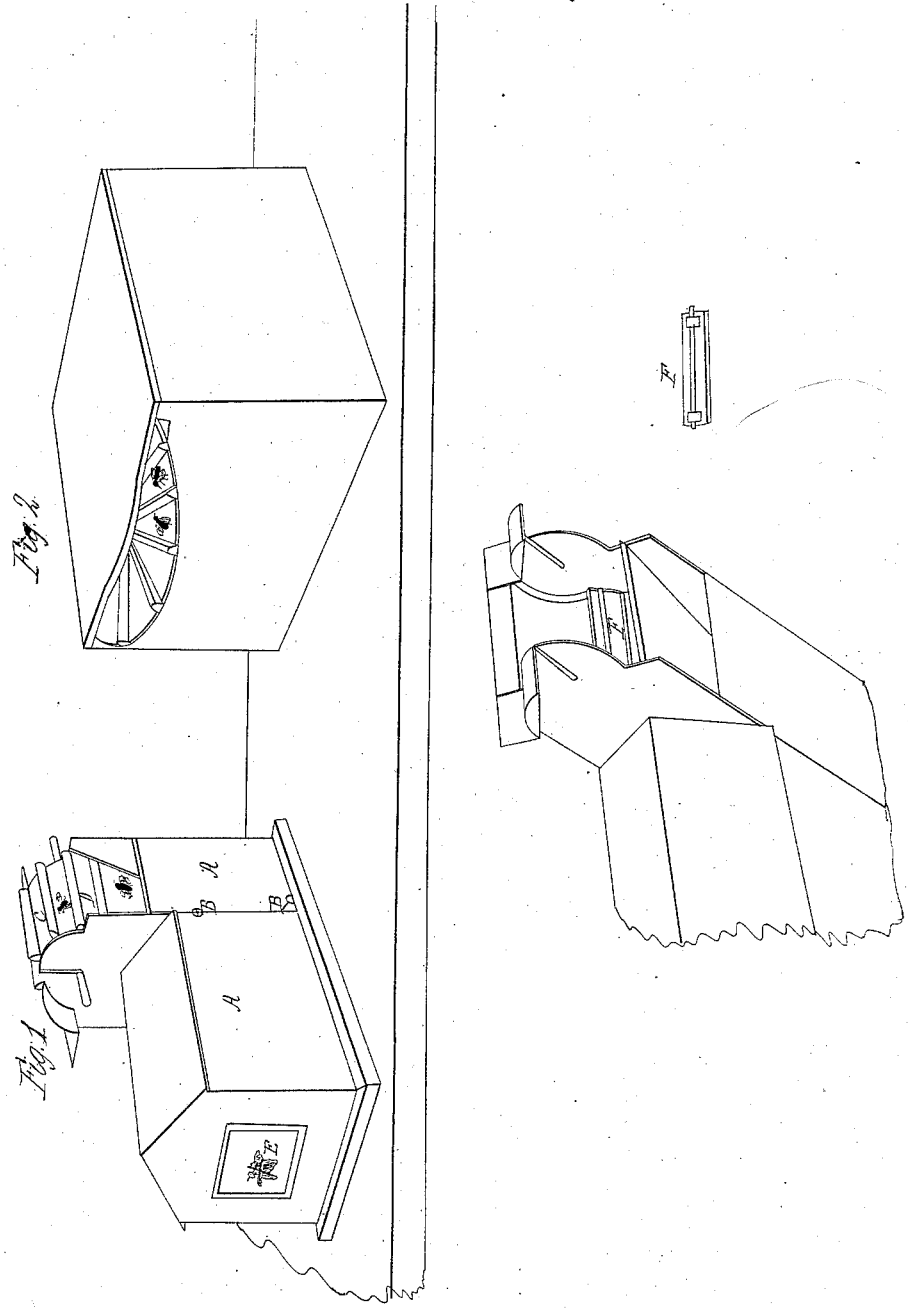

UNITED STATES PATENT OFFICE.

J. B. FULLER AND G. W. PIERCE, OF WORCESTER, MASSACHUSETTS.

TRAP FOR CATCHING FLIES.

Specification forming part of Letters Patent No. 7,288, dated April 16, 1850; Reissued September 7, 1858, No. 597.

*To all whom it may concern:*

Be it known that we, JOEL B. FULLER and GEORGE W. PIERCE, of the city of Worcester, county of Worcester, and State of Massachusetts, have invented a new and useful Machine for Catching Flies, called "Self-Operating Fly-Catcher"; and we do hereby declare that the following is a full, clear, and correct description of the construction and operation of the same, reference being had to the annexed drawings, making a part of these specifications, in which—

Figure 1, shows a perspective view of the machine and wheel, Fig. 2, shows a side view of the machine and parts of the wheel.

A, A, represents the boxes into which the flies are conveyed.

B, B, represents the valves, between the boxes designed to admit the flies from one box to the other or confine them in either box.

C represents the wheel, with floats or projections, on which the flies light, and the revolutions of the wheel conveys the flies into the boxes.

D, represents a glass plate, placed in a perpendicular manner, designed to admit light for the flies when the wheel is in motion, thereby conveying the flies between any of the floats or projections into the box or boxes or vessel.

E, represents a glass, in box A designed for a light to attract the flies.

F, F, represents a cleaner which is to be placed inside of the box, under the wheel, as shown at F. The cleaner is balanced at each end and one side or edge of it is made a little heavier than the other; the heaviest edge will of course hang down and the upper or light edge come nearly in contact with the cylinder or wheel, hits the flies and starts them off between every two floats that come in contact with them. They are thus compelled to go into the box or vessel to find rest.

To enable others skilled in the art to make and use our invention we will proceed to describe it. We construct a box or boxes or vessels of any known form, and we apply a wheel as shown at C, or the floats or projections to the box, boxes or vessels, in any position which will convey the flies into the box, boxes or vessel, as shown at A or by bands passing round a wheel or wheels, with floats or projections on the same, so as to convey the flies into the boxes or vessel.

We construct on the inside of the box or vessel under the wheel a cleaner as shown at F, F, to prevent the escape of the flies from the boxes or vessel. We apply any known mechanical power in the movement of the wheel or bands either by a circular or straight forward motion.

When the wheel is in operation, the bait consisting of sugar, molasses, honey, or any attractive substance being put on the wheel between the floats the flies light thereon and are conveyed under the glass, until they come in contact with the cleaner as shown at letter F, F, and when it becomes necessary to dispose of the flies they are shut in the box by a slide and the box containing the flies is removed, the box emptied and replaced.

What we claim as our invention and for which we wish to secure Letters Patent is—

The application of the devices for conveying flies into a box or vessel by wheels or belts between floats or projections moving either by a circular or straight forward motion in the manner and for the purpose herein specified.

JOEL B. FULLER.
GEORGE W. PIERCE.

Witnesses:
WM. GREENLEAF,
SAMUEL D. BECWITH.

[FIRST PRINTED 1913.]